UNITED STATES PATENT OFFICE.

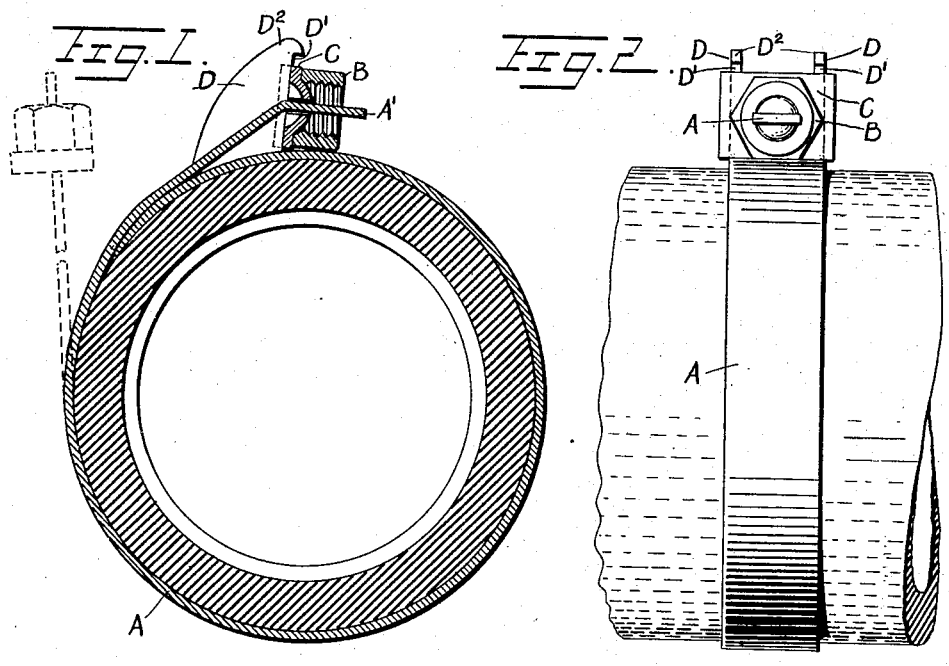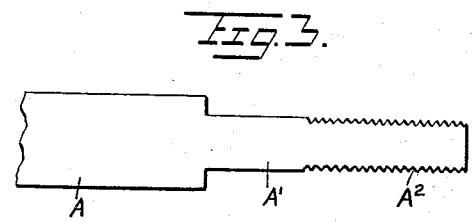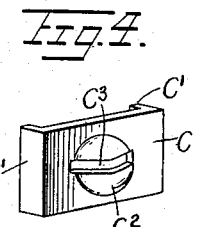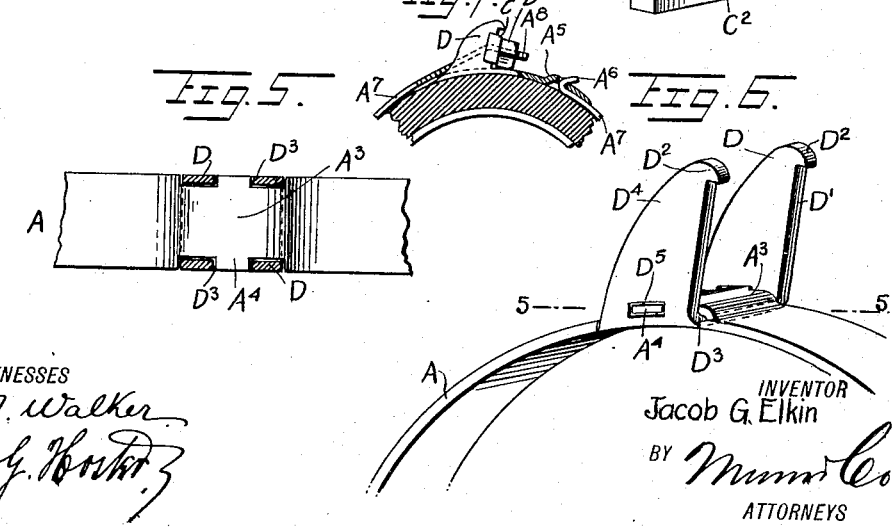

JACOB G. ELKIN, OF NEW YORK, N. Y.

BAND-CLAMP.

1,219,273.

Specification of Letters Patent.  Patented Mar. 13, 1917.

Application filed November 7, 1914. Serial No. 870,836.

*To all whom it may concern:*

Be it known that I, JACOB G. ELKIN, a citizen of the United States, and a resident of the city of New York, borough of Manhattan, in the county and State of New York, have invented a new and Improved Band-Clamp, of which the following is a full, clear, and exact description.

The object of the invention is to provide a new and improved band clamp more especially designed for use on hose, pipe coverings and like articles and arranged to permit of conveniently placing the clamp in position on the article and drawing the band tight around the article without danger of the band becoming accidentally loosened or detached after it is once applied.

In order to accomplish the desired result, use is made of a band provided at one end with an outwardly extending abutment and having its other end threaded, and a nut screwing on the said threaded end and resting against the said abutment.

A practical embodiment of the invention is represented in the accompanying drawings forming a part of this specification, in which similar characters of reference indicate corresponding parts in all the views.

Figure 1 is a cross section of the band clamp as applied;

Fig. 2 is a side elevation of the same;

Fig. 3 is a plan view of the threaded end of the band;

Fig. 4 is a perspective view of the washer for the nut screwing on the threaded end of the band;

Fig. 5 is a sectional plan view of a modified form of the abutment on the band, the section being on the line 5—5 of Fig. 6;

Fig. 6 is a perspective view of the same; and

Fig. 7 is a side elevation of another modified form of the same.

The band A of the hose clamp has one end A' reduced in width and its side edges provided with screw threads $A^2$ on which screws a nut B having a washer C seated on the front edges D' of abutment flanges D extending upwardly on the other end of the band A. The abutment flanges D are spaced apart for the passage of the reduced end A' of the band A so that when the band is passed around the hose pipe coupling or similar article and the nut B is screwed up then the band A is drawn tight around the article.

The front edges D' of the abutment flanges D are preferably inclined upwardly and forwardly so that the washer C is normally as low down on the abutment flanges as possible so that the bottom face of the nut B contacts with the outer face of the band A, to hold the nut B against accidental turning. The height of the front edges D' of the abutment flanges D is somewhat in excess of the height of the washer C to allow the said washer to slide up and down, the upward movement of the washer, however, being limited by stops $D^2$ formed integrally on the upper ends of the abutment flanges D. By the arrangement described the user can tighten the band A whenever it is desired to do so by turning the nut B correspondingly, it being understood that in turning the nut the right-hand bottom corner of the nut engages the face of the band and the bottom of the nut gradually moves out of contact with the face of the band A, and in doing so the nut and the washer C rise to allow further turning of the nut until the desired tightness of the band A is reached. The nut is usually turned until one of its sides is lowermost and in contact with the outer face of the band A to hold the nut against accidental turning, as previously explained. It is understood that after the nut has been screwed up the desired distance with one face lowermost then the nut and washer move downward owing to the inclined faces of the abutment flanges until the bottom face of the nut is in contact with the outer face of the band A.

In order to hold the washer C from displacement in a lateral direction, the sides of the washer are preferably provided with rearwardly extending guiding flanges C' fitting on the outer faces of the abutment flanges D. The washer C is preferably provided with a conical center portion $C^2$ fitting into a countersink at the rear face of the nut B so that the nut is at all times held in a central position relative to the washer C, it being understood that the said central portion $C^2$ is provided with a slot $C^3$ for the passage of the reduced end A' of the band A. By the arrangement described the nut, washer and the end A' of the band readily move in unison up and down by turning the nut B as previously mentioned. It will also be noticed that by the construction shown and described the end A' of the band is as low down as possible and overlies the other end of the band, the terminal of the said other end being a distance beyond the abutment flanges D so as to completely encircle the hose, pipe covering or other article on which the clamp is used.

In practice, I prefer to strike up the abutment flanges D from the material of which the band A is made, but for very wide bands the abutment flanges are preferably made separate from the band A and attached thereto, as indicated in Figs. 5 and 6. In this case the band A is provided with a struck-up and somewhat narrowed portion $A^3$ to provide a seat for the bottom $D^3$ of the abutment flanges $D^4$ provided with apertures $D^5$ near the bottom for the reception of lugs $A^4$ extending from the sides of the struck-up portion $A^3$. By the arrangement described, the abutment flanges are securely fastened to the band A and the latter is smooth on the under side so as to properly fit the article on which the clamp is used. Otherwise the abutment flanges $D^4$ are the same as above described in reference to Figs. 1 and 2.

In the modified form shown in Fig. 7, the abutment flanges D are on a short band $A^5$ hooked in front of the flanges D onto a hook $A^6$ of the main or encircling band $A^7$, provided at its reduced threaded end $A^8$ with a washer C and a nut B engaging the abutment flanges as above described.

It is understood that in placing the band clamp in position on the hose or other article the band A is opened up (see dotted lines in Fig. 1) to allow of placing the band sidewise on the hose, after which the end $A'$ is bent down between the flanges D and with the washer engaging the front faces of the abutment flanges D. The nut B is then screwed on the threaded terminal to draw the band tight around the hose, as previously explained.

It will also be noticed that the guide flanges $C'$ of the washer C prevent the abutment flanges D from spreading when the nut is tightly screwed up.

Having thus described my invention, I claim as new and desire to secure by Letters Patent:

1. A band clamp, comprising a band threaded at one end, an abutment on the other end of the said band and having spaced abutment flanges between which passes the said threaded end, the upper ends of the said flanges having stops, a nut screwing on the said threaded end, and a washer interposed between the said nut and the said flanges, the washer being slidable up and down on the said flanges and its upward movement being limited by the said stops, the said washer having a conical center portion and the said nut being countersunk to receive the said conical center portion.

2. A band clamp, comprising a band threaded at one end, an abutment on the other end of the said band and having spaced abutment flanges between which passes the said threaded end, the front edges of the said flanges being inclined upwardly and forwardly, and the upper ends of the said flanges having stops, a nut screwing on the said threaded end of the band, and a washer interposed between the said nut and the beveled edges of the flanges, the washer being slidable up and down on the said front edges and the upward movement of the washer being limited by the said stops.

3. A band clamp, comprising a band having one end reduced in width and threaded, abutment flanges extending outwardly from the other end of the said band and between which passes the said threaded end of the band, the flanges being inclined upwardly and forwardly and provided with stops at their ends, a nut screwing on the said threaded end, and a washer interposed between the abutment flanges and the nut and provided at the sides with guiding flanges engaging the said abutment flanges.

In testimony whereof I have signed my name to this specification in the presence of two subscribing witnesses.

JACOB G. ELKIN.

Witnesses:
THEO. G. HOSTER,
PHILIP D. ROLLHAUS.

Copies of this patent may be obtained for five cents each, by addressing the "Commissioner of Patents, Washington, D. C."